US007686976B2

(12) United States Patent
Witham et al.

(10) Patent No.: US 7,686,976 B2
(45) Date of Patent: Mar. 30, 2010

(54) COMPOSITION FOR REMOVING ARSENIC FROM AQUEOUS STREAMS

(75) Inventors: Richard Donald Witham, Boulder City, NV (US); Edward Bayer McNew, Las Vegas, NV (US); John Leslie Burba, III, Parker, CO (US)

(73) Assignee: Molycorp Minerals, LLC, Greenwood Village, CO (US)

( * ) Notice: Subject to any disclaimer, the term of this patent is extended or adjusted under 35 U.S.C. 154(b) by 0 days.

(21) Appl. No.: 11/925,247

(22) Filed: Oct. 26, 2007

(65) Prior Publication Data

US 2008/0093580 A1 Apr. 24, 2008

Related U.S. Application Data

(62) Division of application No. 11/435,697, filed on May 16, 2006, now Pat. No. 7,300,589.

(51) Int. Cl.
*C02F 1/58* (2006.01)

(52) U.S. Cl. .............. 252/175; 210/714; 210/721; 210/723; 210/911; 252/179; 502/415

(58) Field of Classification Search ................. 252/175
See application file for complete search history.

(56) References Cited

U.S. PATENT DOCUMENTS

| | | |
|---|---|---|
| 1,739,840 A | 12/1929 | Kendall |
| 3,194,629 A | 7/1965 | Dreibelbis et al. |
| 3,658,724 A | 4/1972 | Stiles |
| 3,768,989 A | 10/1973 | Goetzinger et al. |
| 3,849,537 A | 11/1974 | Allgulin |
| 3,865,728 A | 2/1975 | Abbott et al. |
| 3,916,585 A | 11/1975 | Barks |
| 3,956,118 A | 5/1976 | Kleber et al. |
| 4,001,375 A | 1/1977 | Longo |
| 4,046,687 A | 9/1977 | Schulze |
| 4,078,058 A | 3/1978 | Fox |
| 4,088,754 A | 5/1978 | Monafo |
| 4,094,777 A | 6/1978 | Sugier et al. |
| 4,096,064 A | 6/1978 | Du Fresne |
| 4,101,631 A | 7/1978 | Ambrosini et al. |
| 4,127,644 A | 11/1978 | Norman et al. |
| 4,200,609 A | 4/1980 | Byrd |
| 4,251,496 A | 2/1981 | Longo et al. |
| 4,346,063 A | 8/1982 | Cahn et al. |
| 4,386,063 A * | 5/1983 | Boden .......................... 424/49 |
| 4,404,197 A | 9/1983 | Fox et al. |
| 4,474,580 A | 10/1984 | MacKenzie et al. |
| 4,474,896 A | 10/1984 | Chao |
| 4,477,315 A | 10/1984 | Tomaszewski |
| 4,566,975 A | 1/1986 | Allgulin |
| 4,581,229 A | 4/1986 | Petrow |
| 4,596,659 A | 6/1986 | Nomura et al. |
| 4,622,149 A | 11/1986 | Devuyst et al. |
| 4,661,330 A | 4/1987 | Chane-Ching et al. |
| 4,714,694 A | 12/1987 | Wan et al. |
| 4,786,483 A | 11/1988 | Audeh |
| 4,814,152 A | 3/1989 | Yan |
| 4,818,483 A | 4/1989 | Culling |
| 4,828,832 A | 5/1989 | De Cuellar et al. |
| 4,843,102 A | 6/1989 | Horton |
| 4,849,223 A | 7/1989 | Pratt |
| 4,859,432 A | 8/1989 | David et al. |
| 4,881,976 A | 11/1989 | Gradeff |
| 4,891,067 A | 1/1990 | Rappas et al. |
| 4,917,875 A | 4/1990 | Moore et al. |
| 4,920,195 A | 4/1990 | Kankare et al. |
| 4,935,146 A | 6/1990 | O'Neill et al. |
| 4,946,592 A | 8/1990 | Galaj et al. |
| 4,968,322 A | 11/1990 | Miyawaki et al. |
| 4,973,501 A | 11/1990 | Gradeff |
| 4,997,425 A | 3/1991 | Shioya et al. |
| 5,004,711 A | 4/1991 | Grodek |
| 5,013,534 A | 5/1991 | Dissaux et al. |
| 5,024,769 A | 6/1991 | Gallup |
| 5,043,072 A | 8/1991 | Hitotsuyanagi et al. |
| 5,053,139 A | 10/1991 | Dodwell et al. |

(Continued)

FOREIGN PATENT DOCUMENTS

CN 1248486 3/2000

(Continued)

OTHER PUBLICATIONS

Zhang, Y., Yang, M., and Huang, X., Arsenic(V) removal with a Ce(IV)-doped iron oxide adsorbent, Chemosphere 51 (2003) 945-952.
U.S. Appl. No. 11/958,602, filed Dec. 18, 2007, Burba et al.
U.S. Appl. No. 11/958,644, filed Dec. 18, 2007, Burba et al.
U.S. Appl. No. 11/958,968, filed Dec. 18, 2007, Burba et al.
"Bastnasite", available at htt://webmineral.com/data/Bastnasite-(Ce).shtml, accessed Jul. 30, 2007, 6 pages.
"Carbonates", available on the Molycorp website Dec. 13, 2005, pp. 22-30.
"Cerium: A Guide to its role in Chemical Technology", Molycorp, 1992, 48 pages.
"Clear Choices for Clean Drinking Water", Consumer Reports Jan. 2003, pp. 33-37.
"Foul Release System and Drag", Proceedins of the PCE 2001 Conference, pp. 273-286, Antwerp, 12 pages.

(Continued)

*Primary Examiner*—Peter A Hruskoci
(74) *Attorney, Agent, or Firm*—Sheridan Ross, P.C.

(57) ABSTRACT

Arsenic is removed from water and other aqueous feeds by (1) treating the feed with a compound containing cerium in the +4 oxidation state, preferably cerium dioxide, to oxidize arsenic in the +3 oxidation state to arsenic in the +5 oxidation state and (2) removing the arsenic in the +5 oxidation state from the aqueous phase, normally by contacting the treated feed with alumina or other precipitating agent containing cations in the +3 oxidation state.

32 Claims, No Drawings

U.S. PATENT DOCUMENTS

| | | |
|---|---|---|
| 5,061,560 A | 10/1991 | Tajima et al. |
| 5,064,628 A | 11/1991 | Chane-Ching et al. |
| 5,080,926 A | 1/1992 | Porter et al. |
| 5,082,570 A | 1/1992 | Higgins et al. |
| 5,104,660 A | 4/1992 | Chvapil et al. |
| 5,116,620 A | 5/1992 | Chvapil et al. |
| 5,126,116 A | 6/1992 | Krause et al. |
| 5,145,587 A | 9/1992 | Ishii et al. |
| 5,152,936 A | 10/1992 | Tajima et al. |
| 5,161,385 A | 11/1992 | Schumacher |
| 5,192,452 A | 3/1993 | Mitsui et al. |
| 5,207,877 A | 5/1993 | Weinberg et al. |
| 5,207,995 A | 5/1993 | Bosserman |
| 5,213,779 A | 5/1993 | Kay et al. |
| 5,227,168 A | 7/1993 | Chvapil et al. |
| 5,238,488 A | 8/1993 | Wilhelm |
| 5,260,066 A | 11/1993 | Wood et al. |
| 5,326,737 A | 7/1994 | Kay et al. |
| 5,330,770 A | 7/1994 | Kuno |
| 5,338,460 A | 8/1994 | Yen |
| 5,344,479 A | 9/1994 | Kerfoot et al. |
| 5,358,643 A | 10/1994 | Mcclintock |
| 5,368,703 A | 11/1994 | Brewster |
| 5,389,352 A | 2/1995 | Wang |
| 5,409,522 A | 4/1995 | Durham et al. |
| 5,433,931 A | 7/1995 | Bosserman |
| 5,500,198 A | 3/1996 | Liu et al. |
| 5,505,766 A | 4/1996 | Chang |
| 5,556,545 A | 9/1996 | Volchek et al. |
| 5,575,915 A | 11/1996 | Nakamura et al. |
| 5,575,919 A | 11/1996 | Santina |
| 5,603,838 A * | 2/1997 | Misra et al. ........... 210/665 |
| 5,649,894 A | 7/1997 | White et al. |
| 5,660,802 A | 8/1997 | Archer et al. |
| 5,683,953 A | 11/1997 | Mills |
| 5,688,378 A | 11/1997 | Khoe et al. |
| 5,689,038 A | 11/1997 | Bartram et al. |
| 5,711,930 A | 1/1998 | Albers et al. |
| 5,712,218 A | 1/1998 | Chopin et al. |
| 5,728,404 A | 3/1998 | von Rheinbaben et al. |
| 5,730,995 A | 3/1998 | Shirono et al. |
| 5,783,057 A | 7/1998 | Tomita et al. |
| 5,820,966 A | 10/1998 | Krause et al. |
| 5,859,064 A | 1/1999 | Cronce |
| 5,897,675 A | 4/1999 | Mangold et al. |
| 5,897,781 A | 4/1999 | Dourdeville |
| 5,910,253 A | 6/1999 | Fuerstenau et al. |
| 5,914,287 A | 6/1999 | Saito |
| 5,918,555 A | 7/1999 | Winegar |
| 5,922,926 A | 7/1999 | Back et al. |
| 5,928,504 A | 7/1999 | Hembre et al. |
| 5,994,260 A | 11/1999 | Bonneau |
| 6,001,152 A | 12/1999 | Sinha |
| 6,001,157 A | 12/1999 | Nogami |
| 6,030,537 A | 2/2000 | Shaniuk et al. |
| 6,048,821 A | 4/2000 | Demmel et al. |
| 6,093,328 A | 7/2000 | Santina |
| 6,099,819 A | 8/2000 | Srinivas et al. |
| 6,114,038 A | 9/2000 | Castro et al. |
| 6,132,623 A | 10/2000 | Nikolaidis et al. |
| 6,136,749 A | 10/2000 | Gadkaree et al. |
| 6,143,318 A | 11/2000 | Gilchrist et al. |
| 6,146,539 A | 11/2000 | Mills |
| 6,177,015 B1 | 1/2001 | Blakey et al. |
| 6,180,016 B1 | 1/2001 | Johnston et al. |
| 6,187,192 B1 | 2/2001 | Johnston et al. |
| 6,197,201 B1 | 3/2001 | Misra et al. |
| 6,197,204 B1 | 3/2001 | Heskett |
| 6,200,482 B1 | 3/2001 | Winchester et al. |
| 6,203,709 B1 | 3/2001 | Min et al. |
| 6,214,238 B1 | 4/2001 | Gallup |
| 6,221,118 B1 * | 4/2001 | Yoshida et al. ........... 51/309 |
| 6,221,602 B1 | 4/2001 | Barbera-Guillem et al. |
| 6,224,898 B1 | 5/2001 | Balogh et al. |
| 6,258,334 B1 | 7/2001 | Gadkaree et al. |
| 6,294,006 B1 | 9/2001 | Andou |
| 6,299,851 B1 | 10/2001 | Li et al. |
| 6,312,604 B1 | 11/2001 | Denkewicz et al. |
| 6,319,108 B1 | 11/2001 | Adefris et al. |
| 6,326,326 B1 | 12/2001 | Feng et al. |
| 6,341,567 B1 | 1/2002 | Robertson et al. |
| 6,350,383 B1 | 2/2002 | Douglas |
| 6,368,510 B2 | 4/2002 | Friot |
| 6,372,003 B1 | 4/2002 | Kasai et al. |
| 6,383,273 B1 | 5/2002 | Kepner et al. |
| 6,383,395 B1 | 5/2002 | Clarke et al. |
| 6,391,869 B1 | 5/2002 | Parks et al. |
| 6,395,659 B2 * | 5/2002 | Seto et al. ........... 501/64 |
| 6,395,736 B1 | 5/2002 | Parks et al. |
| 6,403,653 B1 | 6/2002 | Hobson et al. |
| 6,420,434 B1 | 7/2002 | Braue et al. |
| 6,428,705 B1 | 8/2002 | Allen et al. |
| 6,444,143 B2 | 9/2002 | Bawendi et al. |
| 6,460,535 B1 | 10/2002 | Nisewander et al. |
| 6,461,535 B1 | 10/2002 | de Esparza |
| 6,475,451 B1 | 11/2002 | Leppin et al. |
| 6,524,487 B2 | 2/2003 | Kulperger et al. |
| 6,524,540 B1 | 2/2003 | Heinig |
| 6,528,451 B2 | 3/2003 | Brezny et al. |
| 6,536,672 B1 | 3/2003 | Outwater |
| 6,537,382 B1 | 3/2003 | Bartram et al. |
| 6,542,540 B1 | 4/2003 | Leung et al. |
| 6,562,092 B1 | 5/2003 | Ito et al. |
| 6,569,224 B2 | 5/2003 | Kerfoot et al. |
| 6,569,393 B1 | 5/2003 | Hoke et al. |
| 6,576,092 B2 | 6/2003 | Granite et al. |
| 6,599,428 B1 | 7/2003 | Douglas |
| 6,599,429 B1 | 7/2003 | Azizian |
| 6,602,111 B1 | 8/2003 | Fujie et al. |
| 6,602,671 B1 | 8/2003 | Bawendi et al. |
| 6,610,264 B1 | 8/2003 | Buchanan et al. |
| 6,613,230 B2 | 9/2003 | Krulik et al. |
| 6,627,632 B2 | 9/2003 | Parks et al. |
| 6,653,519 B2 | 11/2003 | Koper et al. |
| 6,680,211 B2 | 1/2004 | Barbera-Guillem et al. |
| 6,689,178 B2 | 2/2004 | Ito et al. |
| 6,706,082 B2 | 3/2004 | Ota et al. |
| 6,706,195 B2 | 3/2004 | Jensen et al. |
| 6,716,895 B1 | 4/2004 | Terry |
| 6,719,828 B1 | 4/2004 | Lovell et al. |
| 6,723,349 B1 | 4/2004 | Hill et al. |
| 6,770,483 B2 | 8/2004 | Lyon |
| 6,774,361 B2 | 8/2004 | Bawendi et al. |
| 6,780,332 B2 | 8/2004 | Shiau et al. |
| 6,790,363 B2 | 9/2004 | Vempati |
| 6,790,420 B2 | 9/2004 | Breen et al. |
| 6,800,204 B2 * | 10/2004 | Harck et al. ........... 210/683 |
| 6,808,692 B2 | 10/2004 | Oehr |
| 6,821,434 B1 | 11/2004 | Moore et al. |
| 6,824,690 B1 | 11/2004 | Zhao et al. |
| 6,827,766 B2 | 12/2004 | Carnes et al. |
| 6,833,123 B2 | 12/2004 | Huang et al. |
| 6,843,617 B2 | 1/2005 | Chowdhury et al. |
| 6,843,923 B2 | 1/2005 | Morton |
| 6,846,432 B2 | 1/2005 | Mills |
| 6,849,187 B2 | 2/2005 | Shaniuk |
| 6,852,903 B1 | 2/2005 | Brown et al. |
| 6,855,665 B1 | 2/2005 | Blake et al. |
| 6,858,147 B2 | 2/2005 | Dukhin et al. |
| 6,861,002 B2 | 3/2005 | Hughes |
| 6,862,825 B1 | 3/2005 | Lowndes |
| 6,863,825 B2 * | 3/2005 | Witham et al. ........... 210/665 |
| 6,864,213 B2 | 3/2005 | Labarge et al. |
| 6,881,424 B1 | 4/2005 | Kemp et al. |

| Patent Number | Date | Name |
|---|---|---|
| 6,881,766 B2 | 4/2005 | Hain |
| 6,887,566 B1 | 5/2005 | Hung et al. |
| 6,901,684 B2 | 6/2005 | Ito et al. |
| 6,905,527 B2 | 6/2005 | Ito et al. |
| 6,908,560 B2 | 6/2005 | Guter |
| 6,908,570 B2 | 6/2005 | Green |
| 6,908,628 B2 | 6/2005 | Herruzo |
| 6,914,034 B2 | 7/2005 | Vo |
| 6,919,029 B2 | 7/2005 | Meng et al. |
| 6,927,501 B2 | 8/2005 | Baarman et al. |
| 6,942,840 B1 | 9/2005 | Broderick |
| 6,946,076 B2 | 9/2005 | Mills |
| 6,946,578 B2 | 9/2005 | Nakano et al. |
| 6,957,743 B2 | 10/2005 | Johnston et al. |
| 6,960,329 B2 | 11/2005 | Sellakumar |
| 6,974,564 B2 | 12/2005 | Biermann et al. |
| 6,986,798 B2 | 1/2006 | Bessho et al. |
| 6,987,129 B2 | 1/2006 | Mak et al. |
| 7,008,559 B2 | 3/2006 | Chen |
| 7,033,419 B1 | 4/2006 | Granite et al. |
| 7,048,853 B2 | 5/2006 | Witham et al. |
| 7,048,860 B2 | 5/2006 | Oishi |
| 7,060,233 B1 | 6/2006 | Srinivas et al. |
| 7,067,294 B2 | 6/2006 | Singh et al. |
| 7,074,336 B1 | 7/2006 | Teter et al. |
| 7,094,383 B2 | 8/2006 | Wang et al. |
| 7,101,415 B2 | 9/2006 | Torres et al. |
| 7,101,493 B2 | 9/2006 | Colucci |
| 7,112,237 B2 | 9/2006 | Zeller et al. |
| 7,129,684 B2 | 10/2006 | Park |
| 7,141,227 B2 * | 11/2006 | Chan ......................... 423/263 |
| 7,160,505 B2 | 1/2007 | Belbachir et al. |
| 7,179,849 B2 | 2/2007 | Terry |
| 7,183,235 B2 | 2/2007 | Lovell et al. |
| 7,186,671 B2 | 3/2007 | Smith et al. |
| 7,192,602 B2 | 3/2007 | Fechner et al. |
| 7,211,320 B1 | 5/2007 | Cooper et al. |
| 7,241,629 B2 | 7/2007 | Dejneka et al. |
| 7,252,694 B2 | 8/2007 | Woo et al. |
| 7,252,769 B2 | 8/2007 | Dickinson |
| 7,279,129 B2 | 10/2007 | Lanz et al. |
| 7,282,153 B2 | 10/2007 | Barrett et al. |
| 7,291,272 B2 | 11/2007 | Bourke et al. |
| 7,291,315 B2 | 11/2007 | Obee et al. |
| 7,300,589 B2 | 11/2007 | Witham et al. |
| 7,311,842 B2 | 12/2007 | Kim |
| 7,335,622 B2 | 2/2008 | Koyanaka et al. |
| 7,335,808 B2 | 2/2008 | Koper et al. |
| 7,338,603 B1 * | 3/2008 | McNew et al. ............... 210/660 |
| 7,361,279 B2 | 4/2008 | Hernandez et al. |
| 7,368,412 B2 | 5/2008 | Tranter et al. |
| 7,422,759 B2 | 9/2008 | Kepner et al. |
| 7,431,758 B2 | 10/2008 | Ota et al. |
| 7,445,718 B2 * | 11/2008 | Misra et al. ................. 210/714 |
| 7,459,086 B2 | 12/2008 | Gaid |
| 7,473,474 B2 | 1/2009 | Toreki et al. |
| 7,476,311 B2 | 1/2009 | Litz et al. |
| 2001/0009831 A1 | 7/2001 | Schink et al. |
| 2001/0012856 A1 | 8/2001 | Parks et al. |
| 2002/0003116 A1 | 1/2002 | Golden |
| 2002/0005382 A1 | 1/2002 | Kulperger et al. |
| 2002/0044901 A1 | 4/2002 | Wilson et al. |
| 2002/0072522 A1 | 6/2002 | Parks et al. |
| 2002/0187990 A1 | 12/2002 | Parks et al. |
| 2002/0198136 A1 | 12/2002 | Mak et al. |
| 2003/0015467 A1 | 1/2003 | Johnston et al. |
| 2003/0133990 A1 | 7/2003 | Hursey et al. |
| 2003/0149406 A1 | 8/2003 | Martineau et al. |
| 2003/0156981 A1 | 8/2003 | Mills |
| 2003/0215378 A1 | 11/2003 | Zhou et al. |
| 2004/0031764 A1 | 2/2004 | Heinig |
| 2004/0050795 A1 | 3/2004 | Park et al. |
| 2004/0230086 A1 | 11/2004 | Okun et al. |
| 2005/0069464 A1 | 3/2005 | Obee et al. |
| 2005/0098503 A1 | 5/2005 | Kim |
| 2005/0136486 A1 | 6/2005 | Haushalter |
| 2005/0159307 A1 | 7/2005 | Okun et al. |
| 2005/0230659 A1 | 10/2005 | Hampden-Smith et al. |
| 2005/0257724 A1 | 11/2005 | Guinther et al. |
| 2006/0030622 A1 | 2/2006 | Mak et al. |
| 2006/0049091 A1 | 3/2006 | Cheetham et al. |
| 2006/0070947 A1 | 4/2006 | Conrad |
| 2006/0120930 A1 | 6/2006 | Mizukami |
| 2006/0198883 A1 | 9/2006 | Parks et al. |
| 2006/0228275 A1 | 10/2006 | Rutman |
| 2006/0237369 A1 | 10/2006 | Kirts et al. |
| 2006/0254930 A1 | 11/2006 | Martinie et al. |
| 2007/0012631 A1 | 1/2007 | Coffey et al. |
| 2007/0017871 A1 | 1/2007 | Reddy et al. |
| 2007/0080115 A1 | 4/2007 | Sylvester |
| 2007/0081931 A1 | 4/2007 | Cho et al. |
| 2007/0122327 A1 | 5/2007 | Yang et al. |
| 2007/0149405 A1 | 6/2007 | Spitler et al. |
| 2007/0158251 A1 | 7/2007 | Chau |
| 2007/0169626 A1 | 7/2007 | Sullivan |
| 2008/0156734 A1 | 7/2008 | Burba et al. |
| 2009/0107919 A1 | 4/2009 | Burba et al. |
| 2009/0107925 A1 | 4/2009 | Burba et al. |
| 2009/0111689 A1 | 4/2009 | Burba |
| 2009/0112043 A1 | 4/2009 | Burba et al. |

FOREIGN PATENT DOCUMENTS

| | | |
|---|---|---|
| EP | 0541158 | 5/1993 |
| EP | 0939431 | 1/1999 |
| EP | 1201607 | 2/2002 |
| EP | 1071500 | 2/2005 |
| GB | 2426469 | 11/2006 |
| JP | 11/51917 | 6/1989 |
| JP | 10165948 | 6/1998 |
| JP | 11/090413 | 4/1999 |
| JP | 11/302684 | 11/1999 |
| JP | 2000/024647 | 1/2000 |
| JP | 2002/205062 | 7/2002 |
| JP | 2002349234 * | 12/2002 |
| JP | 2004/050069 | 2/2004 |
| JP | 2004/057870 | 2/2004 |
| JP | 2004/305915 | 11/2004 |
| JP | 2004/330012 | 11/2004 |
| JP | 2005/028312 | 2/2005 |
| JP | 2005/048181 | 2/2005 |
| JP | 2005/288363 | 10/2005 |
| JP | 2006/320847 | 11/2006 |
| JP | 07/081932 | 3/2007 |
| WO | WO 95/11195 | 4/1995 |
| WO | 0132799 * | 5/2001 |
| WO | 0132820 * | 5/2001 |
| WO | WO 03/092748 | 11/2003 |
| WO | WO 2004/076770 | 9/2004 |
| WO | 2004096433 A1 | 11/2004 |
| WO | WO 2005/028707 | 3/2005 |
| WO | WO 2005/042130 | 5/2005 |
| WO | WO 2005/075000 | 8/2005 |
| WO | WO 2005/081722 | 9/2005 |
| WO | WO 2006/011764 | 2/2006 |
| WO | WO 2006/047613 | 5/2006 |
| WO | WO 2006/070153 | 7/2006 |
| WO | WO 2007/011877 | 1/2007 |
| WO | WO 2007/120910 | 10/2007 |

OTHER PUBLICATIONS

"Homogeneous Reactions of As and Se Oxoanions in Aqueous Solutions, and the Photooxidation of their Reduced Species in the X-ray Beam", available at http://geoweb.princeton.edu/research/geochemistry/research/aqueous-oxoanion.html, accessed May 6, 2009.

"Hydrometallurgy", Hazen Research, Inc., available at http://www.hazenusa.com/hydrometallurgy-1.php, accessed Dec. 21, 2006, 7 pages.

"Potentiometry", date unknown, 14 pages.

"The Bacteriostatic Activity of Cerium, Lanthanum, and Thallium", Burkes et al., Journal of Bateriology, 54:417-24 (1947).

"UI Arsenic water treatment project shows promise", University of Idaho, Environmental News Network, Dec. 3, 2002, 2 pages.

Ahmed et al., "Arsenic Mitigation in Bangladesh", Oct. 2002, 67 pages.

Ahmed et al., "Arsenic Mitigation Technologies in South and East Asia", 44 pages, date unknown.

Ahmed, "An Overview of Arsenic Removal Technologies in Bangladesh and India," Buet-Unu International Workshop on Technologies for Arsenic Removal from Drinking Water, May 5-7, 2001, pp. 251-269. cited by other.

Ahmed, "Water Supply Options", available at http://www.physics.harvard.edu/~ wilson/arsenic/conferences/Feroze_Ahmed/Sec_3..., accessed May 8, 2009, 25 pages, Jan. 29, 2002.

Al-Abed et al., "Arsenic Release from Iron Rich Mineral Processing Waste; Influence of pH and Redox Potential", Chemosphere, 66, pp. 775-782 (2007).

Alam et al., "Chemical Extraction of Arsenic from Contaminated Soil", J. Environ Sci Health A Tox Hazard Subst Environ Eng., 41(4), pp. 631-643 (2006).

Alam et al., "Extraction of arsenic in a synthetic arsenic-contaminated soil using phosphate", Chemosphere 43 (2001) 1035-1041.

Ali et al., "Fate of Arsenic in Wastes Generated from Arsenic Removal Units", Bangladesh University of Engineering and Technology, date unknown, pp. 147-159.

Amimono, "Arsenic removal by inorganic ion-exchanger", available at http://www.apecvc.or.jp/e/modules/tinyd00/index.php?id=63&kh_open_cid_00=7, accessed May 8, 2009.

Arsenate, Wikipedia, available at http://en.wikipedia.org/w/index.php?title=Arsenate&printable=yes, accessed May 6, 2009, 2 pages.

Baker et al., "Present General Status of Understanding of Heteropoly Electrolytes and a Tracing of Some Major Highlights in the History of Their Elucidation", Chem. Rev., 1998, vol. 98, No. 1, pp. 3-50.

Banu et al., "Fabrication of Diffaction-encoded micro-particles using nano-imprint lithography", J. Micromech. Microeng. 17 (2007) S116-S121.

Chambers et al., "Modern approaches to marine antifouling coatings", Surface & Coatings Technology 201 (2006) 3642-3652.

Chang, et al., "Wet air oxidation of a reactive dye solution using CoAlPO4-5 and CeO2 catalysts", Chemosphere, Aug. 2003, vol. 52, No. 6, pp. 943-949.

Chi et al., "Preparation of Enriched Cerium Oxide from Bastnasite with Hydrochloric Acid by Two-Step Leaching", Metallurgical and Materials Transactions B, vol. 37B, Apr. 2006-155.

ClearWater Filtration Systems, Press Release, "New Filtration Patent to Revolutionize Home Water Filtration: Arsenic Levels Can Now be Controlled".

Clifford et al., "Oxidizing Arsenic III to Arsenic V for Better Removal", Water & Wastes Digest, Water Quality Products, Mar. 2001, vol. 6, No. 3, available at http://www.wwdmag.com/Oxidizing-Arsenic-III-to-Arsenic-V-for-Better-Removal-..., accessed May 6, 2009, 2 pages.

Coronado et al., "Polyoxometalate-based Molecular Materials", Chem. Re., 1998, vol. 98, No. 1, pp. 273-296.

Corvini et al., "Mercury Removal from Natural Gas and Liquid Streams", UOP LLC, 11 pages, date unknown.

Dejneka et al., "Rare earth-doped glass microbarcodes", PNAS, Jan. 21, 2003, vol. 100, No. 2, 389-393.

Emsley, "The Elements" Third Edition, 1998, pp. 22-23, 26-27, 54-55, 110-111.

Everett et al., "Study of the Uncatalyzed Oxidation of Arsenic(III) by Cerium(IV) in Perchloric Acid Medium", Jan. 10, 1971, Stanford University.

Fertonani et al., "Solid State Reactions of Mercury with Pure Noble Metals Part 2 Mercury iridium system", Journal of Thermal Analysis and Calorimetry, 2002, vol. 67, pp. 403-409.

Fujikawa et al., "Simulteneous removal of arsenic, iron and manganese in biological treatment unit", available at http://www.apecvc.or.jp/e/modules/tinyd00/index.php?id=65&kh_open_cid_00=7, accessed May 8, 2009, 3 pages.

Fujikawa et al., "The aim of this special edition", Kyoto University, available at http://www.apecvc.or.jp/e/modules/tinyd00/index.php?id=61&kh_open_cid_00=7, accessed May 8, 2009.

Goldberg, "Competitive Adsorption of Arsenate and Arsenite on Oxides and Clay Minerals", Soil Sci. Soc. Am. J. 66:413-421 (2002).

Gordon, "Network Progress: An Update from the Secretariat", World Health Organization: International Network to Promote Household Water Treatment and Safe Storage, Issue 2, May 2005, 10 pages.

Gouzerh et al., "Main-Group Element, Organic, and Organometallic Derivatives of Polyoxometalates", Chem. Re., 1998, vol. 98, No. 1, pp. 77-112.

Granite et al., "Novel Sorbents for Mercury Removal from Flue Gas", Ind. Eng. Chem. Res. 2000, 39, 1020-1029.

Granite et al., "Sorbents for Mercury Capture from Fuel Gas with Application to Gasification Systems", Ind. Eng. Chem. Res. 2006, 45, 4844-4848.

Granite et al., "Techniques for Mercury Control and Measurement in Gasification Systems", Presented at the 5th International Symposium on Gas Cleaning at High Temperature, Morgantown, WV, Sep. 2002, pp. 1-5.

Hakuta et al., "Production of Ultra-fine Ceria Particles by Hydrothermal Synthesis Under Supercritical Conditions", Journal of Materials Science Letters, 1998, vol. 17, pp. 1211-1213.

Harck, "Arsenic in the US", Clean Water Filtration Systems, Jan. 2002, 42 pages.

Haron et al., "Sorption removal of arsenic by cerium-exchanged zeolite P", Materials Science and Engineering B, 2008, vol. 149, pp. 204-208.

Harper et al., "Removal of arsenic from wastewater using chemical precipitation methods", Water Environment Research, vol. 64, No. 3, 200-203.

Hayes et al., "The Phase Stability of Cerium Species in Aqueous Systems", Journal of the Electrochemical Society, 149 (12) C623-C630 (2002).

Hemmila et al., "Progree in Lanthanides as Luminscent Probes", Journal of Fluorescence, vol. 15, No. 4, Jul. 2005, 529-542.

Henderson, et al., "Redox properties of water on the oxidized and reduced surfaces of Ce02(111)", Surface Science, Feb. 20, 2003, vol. 526, Nos. 1-2, pp. 1-18, Environ. Molecular Sci. Lab., Pacific Northwest Nat. Lab., Richland, WA.

Hill, "Introduction: Polyoxometalates—Multicomponent Molecular Vehicles to Probe Fundamental Issues and Practical Problems", Chem. Re., 1998, vol. 98, No. 1, pp. 1-2.

Housecroft et al., "Inorganic Chemistry", 2001, Pearson Prentice Hall, chapter 7, pp. 170-186; chapter 14, pp. 338-344; Appendix 11, pp. 752-754; chapter 24, pp. 622-640.

Jadhav, "Development and Evaluation of Nanoscale Sorbents for Mercury Capture from Warm Fuel Gas", Aug. 25, 2006, 44 pages.

Jang et al., "Remediation of Arsenic-Contaminated Solids and Washing Effluents", Chemosphere, 60, pp. 344-354, (2005).

Jeannin, "The Nomenclature of Polyoxometalates: How to Connect a Name and a Structure", Chem. Rev., 1998, vol. 98, No. 1, pp. 51-76.

Johnston et al., "Safe Water Technology for Arsenic Removal", Technologies for Arsenic Removal from Drinking Water, pp. 1-22, date unknown.

Jones et al., "Arsenic 2000: An Overview of the Arsenic Issue in Bangladesh", Water Aid Bangladesh, Dec. 2000, Pages.

Kahakachchi et al., "Extraction of arsenic species from spiked soils and standard reference materials", Analyst 2004, 129, 714-718.

Katsoulis, "A Survey of Applications of Polyoxometalates," Chem. Re., 1998, vol. 98, No. 1, pp. 359-388.

Kim et al., "Carbonate Effects in the Electrochemical Oxidation of Arsenite", Electrochemical Methods for Wastewater and Potable Water Treatment, Preprints of Extended Abstracts, vol. 42, No. 2, 2002.

Klemperer et al., "Polyocoanion Chemistry Moves toward the Future: From Solids and Solutions to Surfaces," Chem. Re., 1998, vol. 98, No. 1, pp. 297-306.

Kozhevnikov, "Catalysis by Heteropoly Acids and Multicomponent Polyoxometalates in Liquid-Phase Reactions", Chem. Re., 1998, vol. 98, No. 1, pp. 171-198.

Lambert, Human Health and Toxicology Information Sheet for Lanthanum Concentrate (5210/5212) and Lanthanum Lantanum Chloride (5240/5241), pp. 1-8, University of California, Irvine.

Lin, et al. "Catalytic wet air oxidation of phenol by various CeO2 catalysts", Water Research, 2002, vol. 36, pp. 3009-3014.

Link et al., "Inorganic Nanoparticles for Transfection of Mammalian Cells and Removal of Viruses from Aqueous Solutions", Biotechnology and Bioengineering, vol. 98, No. 5, Dec. 1, 2007, 1083-1093.

Lipps et al., "Arsenic Removal from Drinking Water by Adsorptive Media", U.S. EPA Demonstration Project at Spring Brook Mobile Home Park in Wales, Me, Six-Month Evaluation Report, Sep. 2006, 12 pages.

Liu, et al. "Effect of CeO2 doping on catalytic activity of Fe2O3/gamma-Al2O(3) catalyst for catalytic wet peroxide oxidation of azo dyes", J. Hazard. Mater., May 8, 2007, vol. 143, Nos. 1-2, pp. 448-454, School of Municipal & Environmental Engineering, Harbin Institute of Technology, China.

Lopez-Anton, et al., "Retention of mercury in activated carbons in coal combustion and gasification flue gases", Fuel Processing Technology, Jun. 20, 2002, vol. 77-78, pp. 353-358.

Lowell et al., "Selection of Metal Oxides for Removing SO2 From Flue Gas", Ind. Eng. Chem. Proc. Des. Dev., 1971, vol. 10, No. 3, pp. 384-390.

Mizuno et al., "Heterogeneous Catalysis", Chem. Re., 1998, vol. 98, No. 1, pp. 199-218.

Muller et al., "Polyoxometalates: Very Large Clusters—Nanoscale Magnets", Chem. Re., 1998, vol. 98, No. 1, pp. 239-272.

Murcott et al., "Innovative and Sustainable Technologies to Address the Global Arsenic Crisis", Sandia National Laboratories 2005 Vendor's Forum, Albuquerque, New Mexico, Nov. 2, 2005, 85 pages.

Mushak, "Potential Impact of Acid Precipitation on Arsenic and Selenium", Environmental Health Perspectives vol. 65, pp. 105-113, 1985.

Ohashi, "Arsenic removal technology—Arsenic removal using manganese oxide", available at http://www.apec-vc.or.jp/e/modules/tinyd00/index.php?id=64&kh_open_cid_00=7, accessed May 8, 2009, 5 pages.

Oztekin, "Recovery of Acides from Salt Forms", Desalinatio, 2007, vol. 212, pp. 62-69.

Peng et al., "Ceria nanoparticles supported on carbon nanotubes for the removal of arsenate from water", Materials Letters, 2005, vol. 59, pp. 399-403.

Portzer et al., "Development of novel sorbents for mercury control at elevated temperatures in coal-derived syngas: Results of initial screening of candidate materials", Fuel Process. Technol. 2004, vol. 85 pp. 621-630.

Puraspec 1156 Mercury Removal, Johnson Matthey Catalysts 2003, 2 pages.

Puszynski et al., "Demonstration Project for Arsenic Removal from Drinking Water at Keystone, South Dakota", Mar. 15, 2005, 23 pages.

Rhule et al., "Polyoxometalates in Medicine," Chem. Re., 1998, vol. 98, No. 1, pp. 327-358.

Sadakane et al., "Electrochemical Properties of Polyoxometalates as Electrocatalysts", Chem. Re., 1998, vol. 98, No. 1, pp. 219-238.

Seida, et al., "Synthesis of clay-cerium hydroxide conjugates for the adsorption of Arsenic", Adsorption Science and Technology, Dec. 2005, vol. 23, No. 8, pp. 607-618.

Shimoto, "Arsenic Removal Technology—Cerium adsorbent", available at http://www.apecvc.or.jp/e/modules/tinyd00/index.php?id=62&kh_open_cid_00=7, accessed May 8, 2009, 4 pages.

Smith et al., "American Rare Earth Minerals: The Indispensable Resource for Clean Energy Technologies", Molycorp Minerals, LLC, Prepared for Congressional Leaders Jan. 29, 2009, 21 pages.

Song, et al., "Mechanism of the Photocatalytic Degradation of C.I. Reactive Black 5 at pH 12.0 Using SrTiO3/Ce02 as the Catalyst", Environmental Science & Technology, 2007, vol. 41, No. 16, pp. 5846-5853, College of Biological and Environmental Engineering, China.

Song, et al., "Photocatalytic degradation of C.I. Direct Red 23 in aqueous solutions under UV irradiation using SrTiO3/CeO2 composite as the catalyst", Journal of Hazardous Materials, Apr. 15, 2008, vol. 152, No. 3, pp. 1301-1308, College of Biological and Environmental Engineering, China.

Spiro et al., J. Chem. Soc. 1965, 78-96.

Spotnitz, et al., "Mediated electrosynthesis with cerium (IV) in methanesulphonic acid", Journal of Applied Chemistry, Mar. 1990, vol. 20, No. 2, 209-215.

Stiltner, "Mercury Removal from Natural Gas and Liquid Streams", 2001, UOP LLC, 10 pages.

Tannehill, "Naturally Occurring Arsenic and Mercury" Proceedings from the Seventy-Fifth Gas Processors Association Conference, May 2007, pp. 54-55.

Thill et al., "Cytotoxicity of Ce02 Nanoparticles for *Escherichia coli*. Physico-Chemical Insight of the Cytotoxicity Mechanism", Environ. Sci. Technol. 2006, 40, 6151-6156.

Tributyltin, available at http://pmep.cce.cornell.edu/profiles/extoxnet/pyrethrins-ziram/tributyltinext.html, accessed Jul. 3, 2008, 6 pages.

Trovarelli, "Cerium Dioxide : a key component in environmental catalysis", Rich MAC Magazine, La Chimica e L'Industria, Sep. 1996, vol. 78, pp. 823-829.

Vu et al., "Review of Arsenic Removal Technologies for Contaminated Groundwaters", Argonne National Laboratory, Apr. 2003, 41 pages.

Wasay et al., "Adsorption of fluoride, phosphate, and arsenate ions on lanthanum-impregnated silica gel", Water Environment Research, vol. 68, No. 3 (May-Jun. 1996), pp. 295-300.

Weinstock, "Homogeneous-Phase Electron-Transfer Reactions of Polyoxometalates", Chem. Re., 1998, vol. 98, No. 1, pp. 113-170.

Worthington et al., "Kinetics and Analytical Applications of the Ruthenium Catalyzed Reaction between Cerium(IV) and Arsenic(III) in Sulferic Acid Medium", Analytical Chemistry, Sep. 1970, vol. 42, No. 11, pp. 1157-1164, Purdue University.

Yamase, "Photo- and Electrochromism of Polyoxometalates and Related Materials," Chem. Re., 1998, vol. 98, No. 1, pp. 307-326.

Yang et al., "Decontamination of Chemical Warfare Agents", Chem Rev., 1992, vol. 92, pp. 1729-1743.

Yates, et al., "Kinetics of the Iodide-catalyzed Reaction between Cerium(IV) and Arsenic(III)", Jan. 19, 1956, Yale University.

Yotsumoto et al., "Latest functions and introduction cost of water treatment technique, Water treatment technique using cerium based adsorbent and examples", Plant and Process, vol. 47, No. 8, pp. 60-63 (2005), Japan.

Yu et al., "The Phase Stability of Cerium Species in Aqueous Systems", Journal of the Electrochemical Society, 153 (1) C74-C79 (2006).

Zhang et al., "Arsenate adsorption on an Fe-Ce bimetal oxide adsorbent : Role of surface properties", Jan. 1, 2005, Institute of Research and Innovation, Japan.

Zhou et al., "Cryptography based on the absorption/emission features of multicolor semiconductor nanocrystal quantum dots", Optics Express, Jun. 28, 2004, vol. 12, No. 13, 2925-2931.

International Preliminary Report on Patentability for International (PCT) Application No. PCT/US2004/002430, mailed Aug. 11, 2005.

International Search Report for International (PCT) Application No. PCT/US2004/002430, mailed Jun. 18, 2004.

Written Opinion for International Application (PCT) No. PCT/US2004/002430, mailed Jun. 18, 2004.

Official Action for Australian Application No. 2004207832, dated Sep. 25, 2008.

Official Action for European Patent Application No. 04706074.4, dated Nov. 17, 2008.

* cited by examiner

COMPOSITION FOR REMOVING ARSENIC FROM AQUEOUS STREAMS

CROSS REFERENCE TO RELATED APPLICATIONS

This application is a divisional application of U.S. Ser. No. 11/435,697, filed May 16, 2006, now pending, which was a divisional of U.S. Ser. No. 11/029,257, filed Jan. 5, 2005, now U.S. Pat. No. 7,048,853, which was a divisional application of U.S. patent application Ser. No. 10/353,705, filed on Jan. 29, 2003, now U.S. Pat. No. 6,863,825.

BACKGROUND OF INVENTION

This invention relates generally to methods, compositions and devices for removing arsenic from aqueous streams and is particularly concerned with methods, compositions and devices for removing arsenic from groundwater and drinking water using cerium in the +4 oxidation state to oxidize arsenic so it can be precipitated from the water.

Arsenic is a toxic element that naturally occurs in a variety of combined forms in the earth. Its presence in natural waters may originate, for example, from geochemical reactions, industrial waste discharges and past agricultural uses of arsenic-containing pesticides. Because the presence of high levels of arsenic may have carcinogenic and other deleterious effects on living organisms, the U.S. Environmental Protection Agency (EPA) and the World Health Organization have set the maximum contaminant level (MCL) for arsenic in drinking water at 10 parts per billion (ppb). Arsenic concentrations in wastewaters, groundwaters, surface waters and geothermal waters frequently exceed this level. Thus, the current MCL and any future decreases, which may be to as low as 2.0 ppb, create the need for new techniques to economically and effectively remove arsenic from drinking water, well water and industrial waters.

Arsenic occurs in four oxidation or valence states, i.e., −3, 0, +3, and +5. Under normal conditions arsenic is found dissolved in aqueous or aquatic systems in the +3 and +5 oxidation states, usually in the form of arsenite ($AsO_3^{-1}$) and arsenate ($AsO_4^{-3}$). The effective removal of arsenic by coagulation techniques requires the arsenic to be in the arsenate form. Arsenite, in which the arsenic exists in the +3 oxidation state, is only partially removed by adsorption and coagulation techniques because its main form, arsenious acid ($HAsO_3$), is a weak acid and remains un-ionized at a pH between 5 and 8 where adsorption takes place most effectively.

Various technologies have been used in the past to remove arsenic from aqueous systems. Examples of such techniques include adsorption on high surface area materials, such as alumina and activated carbon, ion exchange with anion exchange resins, co-precipitation and electrodialysis. However, most technologies for arsenic removal are hindered by the difficulty of removing arsenite. The more successful techniques that have been used in large municipal water supplies are not practical for residential applications because of space requirements and the need to use dangerous chemicals. The two most common techniques for residential water treatment have been reverse osmosis and activated alumina. The former method produces arsenic-containing waste streams that must be disposed of, and the latter requires the use of caustic chemicals.

The above facts coupled with the potential for the decrease in MCL to between 2 and 10 ppb make it imperative that effective processes, compositions and devices for removing arsenic from water and other aqueous systems be developed.

SUMMARY OF THE INVENTION

In accordance with the invention, it has now been found that arsenic can be efficiently and effectively removed from water and other aqueous feedstocks by treating the arsenic-containing aqueous feed with a compound containing cerium in the +4 oxidation state, preferably cerium dioxide ($CeO_2$), in order to oxidize the arsenic so that it can be more easily removed by precipitation from the treated aqueous feed to produce a purified aqueous liquid with a reduced concentration of arsenic. "Precipitation" as used herein encompasses not only the removal of arsenic-containing ions in the form of insoluble species, but also includes the immobilization of arsenic-containing ions on or in insoluble particles. In one embodiment of the process of the invention, water or other aqueous liquid containing dissolved arsenic in the +3 and +5 oxidation states is contacted with cerium dioxide to oxidize arsenic in the +3 oxidation state to arsenic in the +5 oxidation state, and the arsenic in the +5 oxidation state is removed from the aqueous liquid by contacting the liquid with a precipitating agent that reacts with the arsenic in the +5 oxidation state to produce insoluble arsenic compounds and an aqueous liquid of reduced arsenic content.

Typically, the oxidized arsenic is in the +5 oxidation state and dissolved in the water or other aqueous liquid in the form of arsenate ($AsO_4^{-3}$). The precipitating agent used to remove the oxidized arsenic from the aqueous liquid can be anything that reacts with the arsenate or other form of oxidized arsenic to produce insoluble arsenic compounds. For example, the precipitating agent can be cerium in the +3 oxidation state produced in the arsenic oxidation step when cerium in the +4 oxidation state is reduced. Alternatively, the precipitating agent can be any particulate solid containing cations in the +3 oxidation state, such as alumina, aluminosilicates, ion exchange resin and clays.

The oxidation and precipitation steps can be carried out in the same or separate zones. If the steps are carried out in the same zone, the compound containing cerium in the +4 oxidation state is usually mixed with the precipitating agent. Although this mixture can be made by supporting the cerium compound on the surface and/or in the pores of the precipitating solids, it is usually preferred that the cerium compound in particulate form be physically mixed with particles of the precipitating agent. A preferred composition of the invention comprises a mixture of cerium dioxide and alumina.

In a preferred embodiment of the process of the invention, an aqueous liquid containing dissolved arsenic in the from of arsenate and arsenite is contacted with a mixture of cerium dioxide particulates and alumina particulates in an oxidation zone such that the cerium dioxide oxidizes the arsenite to arsenate and the alumina reacts with the arsenate to form insoluble aluminum arsenate that sorbs onto the particles of alumina. The aqueous liquid exiting the oxidation zone contains a substantially reduced concentration of arsenic, usually less than about 2.0 ppb.

In one embodiment, the rare earth composition is essentially devoid of lanthanum.

In one embodiment, the rare earth composition is essentially free of all rare earths except cerium.

DETAILED DESCRIPTION OF THE INVENTION

Although the process of the invention is primarily envisioned for removing dissolved arsenic from drinking water and groundwater, it will be understood that the process can be used to treat any aqueous liquid feed that contains undesirable amounts of arsenic. Examples of such liquid feeds include, among others, well water, surface waters, such as water from lakes, ponds and wetlands, agricultural waters, wastewater from industrial processes, and geothermal fluids. The arsenic-containing feed can also contain other inorganic contaminants, such as selenium, cadmium, lead and mercury, and certain organic contaminants. Generally, the process of the invention can be used to treat any aqueous liquid feedstock containing more than 2.0 ppb arsenic and is effective for treating feeds containing more than 500 ppb arsenic. The process is effective in decreasing the arsenic levels in such feeds to below 5.0 ppb, usually to below 2.0 ppb.

The arsenic contaminating the aqueous feed is normally dissolved in the aqueous phase and usually exists in both the +3 and +5 oxidation states, respectively, as arsenite ($AsO_3^{-1}$) and arsenate ($AsO_4^{-1}$). Techniques for removing arsenate exist and are quite effective, but removing the arsenite is a more difficult proposition because the present technologies for doing so are not greatly effective. It has now been found that substantially all of the dissolved arsenite can be easily oxidized to arsenate by treating the aqueous feed with cerium in the +4 oxidation state and the resulting arsenate, along with the arsenate originally present in the aqueous feed, precipitated from the treated feed to produce an arsenic-depleted aqueous liquid.

In the process of the invention, the aqueous feed contaminated with arsenic is passed through an inlet into an oxidation vessel at a temperature and pressure, usually ambient conditions, such that the water in the feed remains in the liquid state. If the feed is contaminated with particulate solids, it is usually treated to remove the solids before it is passed into the oxidation vessel. Any liquid-solids separation technique, such as filtration, centrifuging and hydrocycloning, can be used to remove the particulate solids.

In the oxidation vessel the aqueous feed is contacted with a compound containing cerium in the +4 oxidation state (hereinafter referred to as cerium, +4), which Ce +4 is an extremely strong oxidizing agent and oxidizes any arsenite or other arsenic present in the +3 oxidation state to arsenate or other species containing arsenic in the +5 oxidation state. All of the arsenic species containing arsenic in the +5 oxidation state is then precipitated from the aqueous phase by contacting the oxidized aqueous feed with a precipitating agent.

The oxidizing agent can be any solid or liquid containing cerium in the +4 oxidation state. Although it is generally preferred to use solid particles of cerium dioxide, which are insoluble in water and relatively attrition resistant as the oxidizing agent, water-soluble cerium compounds can also be used. Examples of such compounds include ceric ammonium nitrate, ceric ammonium sulfate, ceric sulfate, and ceric nitrate.

The precipitating agent that reacts with the arsenate containing arsenic in the +5 oxidation state to form insoluble arsenic compounds can be present in the oxidation vessel with the cerium +4 compound so that the precipitation occurs essentially simultaneously with the oxidation. Alternatively, it can be in a separate vessel into which the treated liquid exiting the oxidation vessel passes. For simplicity purposes, it is normally preferred for both the cerium compound and precipitating agent to be present in the oxidation vessel. This embodiment of the invention eliminates the need for an extra vessel and thereby reduces the cost of installing and operating the process of the invention.

Although the precipitating agent can be any material, solid or liquid, that reacts with arsenate or other species containing arsenic in the +5 oxidation state to form insoluble arsenic compounds, it is usually a particulate solid that contains cations in the +3 oxidation state, which cations react with arsenate to form insoluble arsenate compounds. Examples of such solids containing cations in the +3 oxidation state include alumina, gamma-alumina, activated alumina, acidified alumina such as alumina treated with hydrochloric acid, metal oxides containing labile anions such as aluminum oxychloride, crystalline alumino-silicates such as zeolites, amorphous silica-alumina, ion exchange resins, clays such as montmorillonite, ferric sulfate, porous ceramics, and cerium compounds containing cerium in the +3 oxidation state, such as cerous carbonate. Although lanthanum oxide and other rare earth compounds can be used as the precipitating agent, these materials are typically not employed (except of course for cerium compounds) in the process of the invention because it is preferred to use a precipitating agent that has a much smaller Ksp than that of the rare earth compounds.

As mentioned above it is normally preferable that the cerium +4 compound and precipitating agent both be present in the oxidation vessel so that the arsenic is oxidized and precipitated essentially simultaneously in the same vessel. Although the cerium +4 compound and precipitating agent can both be water-soluble, it is normally preferred that the cerium +4 compound and precipitating agent both be water-insoluble particulate solids that are either slurried with the aqueous feed in the oxidation vessel or physically mixed together in a fixed bed through which the aqueous feed is passed during the oxidation step. In an alternative embodiment of the invention, the cerium +4 compound can be deposited on the surface and/or in the pores of the solid precipitating agent. This embodiment is normally not preferred over a physical mixture because supporting the cerium compound on or in the precipitating solids requires the cerium compound to be dissolved in a liquid, the resultant solution mixed with the support solids, and the wet solids dried. Such steps add significantly to the cost of practicing the process of the invention.

Normally, a sufficient amount of the cerium +4 compound is present in the oxidation vessel with the particulate precipitating agent so that the mixture of the two contains between about 8 and 60 weight percent of the cerium +4 compound calculated as the oxide. Preferably, the mixture will contain between about 10 and 50 weight percent, more preferably between about 20 and 30 weight percent, of the cerium +4 compound calculated as the oxide. However, in some instances, it may be desirable for the mixture to contain greater than 40 to 45 weight percent of the cerium +4 compound calculated as the oxide.

Regardless of whether the cerium +4 compound is present in the oxidation vessel in admixture with the particulate precipitating agent or supported on or in the pores of the precipitating agent, the solids will typically range in diameter between about 0.25 and 1.5, preferably from 0.5 to 1.0, millimeters. When the cerium +4 compound and precipitating agent are present in the oxidation zone as a fixed bed, it is normally preferred that the particles be spherical in shape so the flow of the aqueous feed through the bed is evenly distributed. However, if desired, the particles may take other shapes including that of extrudates. Such extrudates would typically have a length between about 0.2 and about 3.0 millimeters.

During the oxidation step of the process of the invention, arsenite in the aqueous feed is oxidized to arsenate according to the following equation:

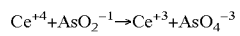

As the cerium +4 oxidizes the arsenite, it is reduced to cerium in the +3 oxidation state, which then reacts with the arsenate formed during the oxidation step to produce insoluble cerium arsenate as shown in the following equation:

$$Ce^{-3} + AsO_4^{-3} \rightarrow CeAsO_{4\,(solid)}$$

Although theoretically there is enough cerium +3 formed by reduction of cerium +4 to react with all of the arsenate formed in the oxidation reaction to precipitate the arsenate, it is normally preferred that an additional precipitating agent be present. This agent, which can be a compound containing cerium +3, reacts with any unreacted arsenate to form an insoluble precipitate, which is removed from the aqueous feed to produce the desired arsenic-depleted aqueous liquid.

The oxidation step that takes place in the oxidation vessel is normally carried out at ambient pressure, at a temperature from about 4° to 100° C., preferably from about 5° to 40° C., and at a pH greater than about 3.0. The residence time of the aqueous feed in the oxidation vessel typically ranges from about 2.0 to about 30 minutes. When the cerium +4 compound and arsenic precipitant are both solid particulates and present together as a fixed bed in the oxidation vessel, the precipitated arsenic compounds will be sorbed by or otherwise associated with the solid particles of the precipitating agent so that the aqueous fluid exiting the oxidation vessel will contain essentially no solids and very little arsenic, usually less than about 10 ppb and quite frequently less than 2.0 ppb. If the precipitating agent is not in the oxidation vessel, the effluent from the vessel is passed to another vessel where it is treated separately with the arsenic precipitating agent. Finally, if the cerium +4 compound and precipitating agent are particulate solids that are slurried with the aqueous feed in the oxidation vessel, the effluent from the vessel is normally treated to separate the solids, including the insoluble arsenic compounds formed in the vessel, from the arsenic-depleted liquid. Although the separation can be carried out in any type of device capable of removing particulates from liquids, a filtration system is typically employed.

If the aqueous feed to the process of the invention contains other contaminants that must be removed in addition to arsenic to produce the desired purified aqueous product, the removal of these contaminants is typically carried either before or after the oxidation step. If the other contaminants will interfere with the oxidation of the arsenic, they should be removed prior to the oxidation step. In some cases the process of the invention is also effective for removing other contaminants from the aqueous feed in addition to or to the exclusion of arsenic.

In a preferred embodiment of the invention, an arsenic purifying device containing a cartridge or filter is used to treat residential drinking water. The treating device can be a free standing container with a filtering device containing the composition of the invention or a cartridge type device designed to fit under a sink. These devices are situated so that the water entering the home or business location passes through the filter or cartridge before it enters the sink faucet. The filter and cartridge devices are quite simple and comprise a inlet attached to the source of the drinking water, a filter or cartridge containing the cerium +4 oxidizing agent, usually in the form of a fixed bed and in admixture with an arsenic precipitant, and an outlet in communication with the sink faucet to direct the arsenic-depleted drinking water exiting the cartridge or filter to the entrance of the faucet. Alternatively, a cartridge or filter type device can be designed to fit onto the faucet so that water exiting the faucet passes through the cartridge or filter device before it is consumed.

In the filter or cartridge, arsenic in the +3 oxidation state is oxidized to arsenic in the +5 oxidation state, and substantially all of the dissolved arsenic +5 present reacts with cerium in the +3 oxidation state and the arsenic precipitating agent to form insoluble arsenic compounds that are sorbed onto the fixed bed solids. The precipitating agent is preferably alumina or an ion exchange resin. The effluent exiting the fixed bed and the outlet of the cartridge or filter device will typically have an arsenic concentration less than about 2.0 ppb. After the fixed bed in one of the cartridge or filter devices becomes saturated with arsenic, the cartridge or filter is replaced with a new cartridge or filter of the same or similar design. The spent cartridge or filter is then disposed of in a legally approved manner.

In another embodiment, the process of the invention is used in community water treatment facilities to remove arsenic from drinking water before the water is distributed to local homes and businesses. For such use the cerium +4 oxidizing agent is typically present in large tanks in either slurry form or in a fixed bed so that relatively large amounts of arsenic-containing water can be treated either in a continuous or batch mode. The arsenic precipitant can be present either in the tank with the cerium +4 oxidizing agent or in a separate vessel fed by the effluent from the tank. The water exiting the process typically has an arsenic concentration less than about 10 ppb, usually less than 5.0 ppb, and preferably less than 2.0 ppb.

The nature and objects of the invention are further illustrated by the following example, which is provided for illustrative purposes only and not to limit the invention as defined by the claims. The example shows that arsenic in the +3 and +5 oxidation state can be completely removed from water using cerium dioxide.

EXAMPLE

Test solutions were prepared to mimic arsenic-containing groundwater by mixing certified standard solutions of arsenic in the +3 and +5 oxidation states with tap water containing no arsenic. Twenty grams of lanthanum oxide ($La_2O_3$), 20 grams of cerium dioxide ($CeO_2$), and a mixture of 10 grams of lanthanum oxide and 10 grams of cerium dioxide were separately placed in a sealed 100 milliliter glass container and slurried with about 96 milliliters of test solutions containing 100 ppb of arsenic +3, 100 ppb of arsenic +5, and 50 ppb of both arsenic +3 and arsenic +5. The resultant slurries were agitated with a Teflon coated magnetic stir bar for 15 minutes. After agitation, the tap water was separated from the solids by filtration through Whatman #41 filter paper and sealed in 125 milliliter plastic sample bottles. The bottles were then sent to a certified drinking water analysis laboratory where the amount of arsenic in each sample was determined by graphite furnace atomic absorption spectroscopy. The results of these tests are set forth below in Table 1.

TABLE 1

| Test No. | Arsenic in Water Before Test | | Slurried Material percent | Arsenic in Water After Test ppb | Arsenic Removed percent |
| | ppb $As^{+3}$ | ppb $As^{+5}$ | | | |
|---|---|---|---|---|---|
| 1 | 0 | 0 | 0 | 0 | NA |
| 2 | 50 | 50 | 0 | 100 | 0 |
| 3 | 50 | 50 | 100% $La_2O_3$ | 45 | 55 |
| 4 | 50 | 50 | 100% $CeO_2$ | 0 | 100 |
| 5 | 50 | 50 | 50% $La_2O_3$ 50% $CeO_2$ | 0 | 100 |

TABLE 1-continued

| Test No. | Arsenic in Water Before Test | | Slurried Material percent | Arsenic in Water After Test ppb | Arsenic Removed percent |
|---|---|---|---|---|---|
| | ppb $As^{+3}$ | ppb $As^{+5}$ | | | |
| 6 | 100 | 0 | 50% $La_2O_3$ 50% $CeO_2$ | 0 | 100 |
| 7 | 0 | 100 | 50% $La_2O_3$ 50% $CeO_2$ | 0 | 100 |
| 8 | 0 | 0 | 50% $La_2O_3$ 50% $CeO_2$ | 0 | NA |

The data for test 3 in the table show that, when lanthanum oxide is used by itself, only 55 percent of the arsenic present in the arsenic-spiked tap water is removed. Since the solubility of lanthanum arsenate, which contains arsenic +5, is very small, it was assumed that the arsenic remaining in solution was primarily arsenic +3 in the form of arsenite. The results of test 4, on the other hand, show that cerium dioxide can remove all of the arsenic from the water. The disparity in these results is attributed to the fact that cerium exists in the +4 oxidation state in cerium dioxide and is a strong oxidizing agent, whereas the lanthanum in the lanthanum oxide, which is in the +3 oxidation state, is not an oxidizing agent. Although the lanthanum +3 reacts with arsenic in the +5 oxidation state to precipitate it from the water, the lanthanum does not react with the arsenic in the +3 oxidation state. The cerium in the cerium dioxide oxidizes the arsenic +3 to arsenic +5, which then reacts with cerium +3 formed by the reduction of cerium +4 to precipitate all of the arsenic dissolved in the water. Tests 5-7 show that equal mixtures of cerium dioxide and lanthanum oxide are also effective in removing all of the arsenic from the tap water.

Although this invention has been described by reference to several embodiments of the invention, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

We claim:

1. A composition comprising a mixture of particles of cerium dioxide ($CeO_2$) to oxidize arsenic in the +3 oxidation state to arsenic in the +5 oxidation state and a rare earth precipitating agent in the +3 oxidation state to precipitate, from an aqueous solution, the arsenic in the +5 oxidation state, wherein said cerium dioxide and rare earth precipitating agent are in the form of a slurry or physical mixture.

2. The composition defined by claim 1, further comprising particulate solids and wherein said particulate solids comprise alumina.

3. The composition defined by claim 2 essentially devoid of lanthanum, and wherein the particles in said mixture range in diameter from about 0.25 to 1.5 millimeters.

4. The composition defined by claim 2 essentially devoid of all rare earths except cerium.

5. The composition defined by claim 2, wherein the particles in said mixture range in diameter from about 0.5 to 1.0 millimeters.

6. The composition of claim 1, wherein the rare earth precipitating agent comprises a rare earth compound and wherein the composition comprises from about 8 to about 60 wt. % of the cerium oxidizing agent in the form of an oxide.

7. The composition of claim 1, wherein the rare earth precipitating agent is compounded with arsenic in the +5 oxidation state.

8. A composition, comprising:
    (a) a cerium oxidizing agent to oxidize arsenic in the +3 oxidation state to arsenic in the +5 oxidation state, the cerium in the cerium oxidizing agent having a first oxidation state of +4; and
    (b) a cerium precipitating agent to precipitate, from an aqueous solution, the arsenic in the +5 oxidation state, the cerium in the cerium precipitating agent having a second oxidation state of +3.

9. The composition of claim 8, wherein the cerium oxidizing agent and precipitating agent are substantially water insoluble.

10. The composition of claim 9, wherein the cerium oxidizing agent is supported on a substrate selected from the group consisting of alumina, gamma-alumina, activated alumina, acidified alumina, metal oxides comprising labile anions, crystalline alumino-silicates, amorphous silica alumina, ion exchange resins, clays, ferric sulfate, porous ceramics, and mixtures thereof.

11. The composition of claim 9, wherein the cerium oxidizing agent and precipitating agent are in the form of a slurry or physical mixture.

12. The composition of claim 9, wherein the cerium oxidizing agent comprises cerium dioxide, ceric ammonium nitrate, ceric ammonium sulfate, ceric sulfate, or ceric nitrate.

13. The composition of claim 8, wherein the cerium oxidizing agent and precipitating agent are substantially water soluble.

14. The composition of claim 8, wherein the cerium oxidizing agent oxidizes arsenite to arsenate and wherein the cerium precipitating agent is compounded with arsenic in the +5 oxidation state.

15. The composition of claim 8, wherein the composition comprises from about 8 to about 60 wt. % of the cerium oxidizing agent in the form of an oxide.

16. The composition of claim 8, wherein the composition is in the form of a particulate and wherein at least most of the particulate has a diameter of from about 0.25 to about 1.5 mm.

17. The composition of claim 8, wherein the cerium precipitating agent comprises cerous carbonate.

18. A composition, comprising:
    a cerium oxidizing agent to oxidize arsenic in the +3 oxidation state to arsenic in the +5 oxidation state, the cerium in the cerium oxidizing agent having a first oxidation state of +4;
    a rare earth precipitating agent, the rare earth in the rare earth precipitating agent having a second oxidation state of +3 and the rare earth precipitating agent being capable of forming a precipitate with arsenic; and
    arsenic compounded with the rare earth precipitating agent, the arsenic having an oxidation state of +5.

19. The composition of claim 18, wherein the cerium oxidizing agent and rare earth precipitating agent are substantially water insoluble.

20. The composition of claim 19, wherein the cerium oxidizing agent is supported on a substrate is selected from the group consisting of alumina, gamma-alumina, activated alumina, acidified alumina, metal oxides comprising labile anions, crystalline alumino-silicates, amorphous silica alumina, ion exchange resins, clays, ferric sulfate, porous ceramics, and mixtures thereof.

21. The composition of claim 19, wherein the cerium oxidizing agent and rare earth precipitating agent are in the form of a slurry or physical mixture.

22. The composition of claim 19, wherein the cerium oxidizing agent comprises ceric ammonium nitrate, cerium dioxide, ceric ammonium sulfate, ceric sulfate, or ceric nitrate.

23. The composition of claim 18, wherein the cerium oxidizing agent and rare earth precipitating agent are substantially water soluble and.

24. The composition of claim 18, wherein the rare earth precipitating agent is lanthanum oxide.

25. The composition of claim 18, wherein the rare earth precipitating agent is cerous carbonate.

26. The composition of claim 18, wherein the cerium oxidizing agent oxidizes arsenite to arsenate.

27. The composition of claim 18, wherein the precipitating agent comprises a rare earth compound and wherein the composition comprises from about 8 to about 60 wt. % of the cerium oxidizing agent in the form of an oxide.

28. The composition of claim 18, wherein the composition is in the form of a particulate and wherein at least most of the particulate has a diameter of from about 0.25 to about 1.5 mm.

29. A composition, comprising:
  a water-soluble cerium oxidizing agent to oxidize arsenic in the +3 oxidation state to arsenic in the +5 oxidation state, the cerium in the cerium oxidizing agent having an oxidation state of +4, and
  a cerium precipitating agent to form a precipitate with the arsenic in the +5 oxidation state, the cerium in the cerium precipitating agent having an oxidation state of +3.

30. The composition of claim 29, wherein the cerium precipitating agent is compounded with arsenic in the +5 oxidation state.

31. The composition of claim 29, wherein the cerium oxidizing agent comprises ceric ammonium nitrate, ceric ammonium sulfate, ceric sulfate, or ceric nitrate.

32. The composition of claim 29, wherein the cerium precipitating agent comprises cerous carbonate and further comprising:
  a particulate material comprising alumina, gamma-alumina, activated alumina, acidified alumina, metal oxides comprising labile anions, crystalline alumino-silicates, amorphous silica alumina, ion exchange resins, clays, ferric sulfate, or porous ceramics.

* * * * *